United States Patent [19]
Kim et al.

[11] Patent Number: 5,237,042
[45] Date of Patent: Aug. 17, 1993

[54] PROCESS FOR THE PREPARATION OF POLYBUTYLENE TEREPHTHALATE BASED POLYMER

[75] Inventors: Chung Y. Kim; Hyun N. Cho; Young C. Kim, all of Seoul, Rep. of Korea

[73] Assignee: Korea Institute of Science and Technology, Seoul, Rep. of Korea

[21] Appl. No.: 799,242

[22] Filed: Nov. 27, 1991

[30] Foreign Application Priority Data

Jun. 12, 1991 [KR] Rep. of Korea ............... 9668/1991

[51] Int. Cl.$^5$ ................ C08G 63/78; C08G 63/82; C08G 63/87
[52] U.S. Cl. ................................ 528/279; 528/271; 528/272; 528/274
[58] Field of Search ............ 528/271, 272, 279, 274

[56] References Cited

U.S. PATENT DOCUMENTS 3,936,421  2/1976  Hayashi et al. ................ 524/710

FOREIGN PATENT DOCUMENTS

| | | |
|---|---|---|
| 48-47594 | 7/1973 | Japan . |
| 49-57092 | 6/1974 | Japan . |
| 55-7853 | 2/1980 | Japan . |
| 55-30010 | 8/1980 | Japan . |
| 55-34829 | 9/1980 | Japan . |
| 63-40209 | 8/1988 | Japan . |
| 01282215 | 11/1989 | Japan . |
| 3-7728 | 1/1991 | Japan . |

OTHER PUBLICATIONS

Kuratsuji et al. CA115(10): 93215e Jpn. Kosai Tokkyo Koho, 7 pp.; abstract.
Azuma et al. CA112(18): 159238m Jpn. Kokai Tokkyo Koho, 10 pp.; abstract.
Fortunato et al. CA110(20): 173811h Polym. Commun., 30(2), 55–57; abstract.

*Primary Examiner*—John Kight, III
*Assistant Examiner*—T. Mosley
*Attorney, Agent, or Firm*—Lowe, Price, LeBlanc & Becker

[57] ABSTRACT

This invention relates to processes for the preparation of polybutylene terephthalate based polymer, which processes produce polymer having excellent color, a small amount of side-product and a high degree of polymerization within a short time. Complex catalyst which is employed comprises antimony compounds and titanium compounds, optionally together with phosphorous based compounds and hindered phenolic, and the catalyst decreases the phenomena that conventional catalysts of tin and titanium based compounds have of making the polymer colored by declining hydrolyzation and heat-stability. The catalyst also decreases the amount of side-product, THF sharply. As a result, improved polybutyleneterephthalate can be prepared.

8 Claims, No Drawings

PROCESS FOR THE PREPARATION OF POLYBUTYLENE TEREPHTHALATE BASED POLYMER

BACKGROUND OF THE INVENTION

The present invention relate to a process for the preparation of polybutylene terephthalate (PBT) based polymer by using a complex catalyst which consists of titanium compounds and antimony compounds.

More particularly, the present invention relates to a novel and improved preparation method of PBT, which includes a polymerizing step using a complex catalyst composed of either one or both of titanium compounds of general formula (I) and general formula (II), and antimony compounds.

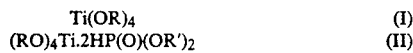

wherein R and R' represent individually, methyl, ethyl, n-propyl, isopropyl, n-butyl, isobutyl, sec-butyl, tert-butyl, n-amyl, acetylisopropyl, pentyl, hexyl, heptyl, 2-ethyl hexyl, octyl, decyl dodecyl, tridecyl, octadecyl, stearyl, allyl, 2,2-diallyloxymethylbutyl, cyclopentyl, cyclohexyl, naphthyl, phenyl, benzyl or dodecyl benzyl group.

Antimony compounds can be selected from the group consisting of antimony trioxide, antimony triacetate or antimony ethyleneglycoxide.

Common PBT manufacture has been widely used in films and plastic mouldings industrial due to its excellent physical properties such as moulding, heat-resistance and chemical-resistance. Generally, the process of this invention (PBT) comprises a direct esterification step or an ester interchange step of terephthalic acid or dimethyl terephthalate with 1,4-butanediol (hereinafter, BD), forming bis($\delta$-hydroxy butyl) terephthalate and/or its oligomer thereof (hereinafter, ester compound) and a condensation step of produced ester compound under the reduced pressure, thereby obtaining the higher polymer.

In the above mentioned esterification (direct esterification or ester interchange) and condensation, reaction catalyst which is composed essentially of metal catalyst such as titanium and antimony compound, is required to increase the velocity of the reaction.

It is well-known that color and physical properties of produced polymer as well as the velocity of reaction depend on the type and the amount of used catalyst.

The higher polymer (PBT) preparation method using titanium catalyst exhibits a fast rate of reaction. However, it involves problems such as coloration of the resultant polymer and excessive production of side-product, tetrahydrofuran (Japanese patent laid-open publication No. 48-47594, Patent Publication Nos. 55-34829 and 55-30010). Also, titanium compounds are good as reaction catalyst, but have defects that they are hydrolyzed easily with water produced during the reaction to form insoluble impurities and their catalytic activity has been declining sharply.

Thus, to solve the problems mentioned above, the process of adding catalyst divided before and after esterification (Japanese patent laid-open publication No. 49-57092), and the process of adding Iodine compound before condensation (Japanese patent publication Nos. 55-7853 and 63-40209), are known but they have a limited effect.

SUMMARY OF THE INVENTION

As described above, to produce high quality PBT based polymer in high-yield, it is of general interest in using a process having the fast rate of reaction, no coloration of PBT polymer and small-amount production of the product, THF.

The present inventors have kept studying to produce a noncolored PBT based polymer with fast rate of esterification and condensation and small-amount of side product THF, and finally discovered the present invention.

The invention comprises:

(a) esterification step of BD or glycol essentially composed thereof, with terephthalate or dicarboxylic acid essentially composed thereof and derivatives thereof; forming bis ($\delta$-hydroxy butyl) terephthalate and/or ester compound mainly comprised oligomer thereof; and (b) condensation step to produce PBT based polymer, characterized in weight ratio in the reaction catalyst of titanium compound/antimony compound = 10/1-1/10 and using the complex catalyst prepared from solving the reaction catalyst in BD. Thereabove, when weight ratio of titanium compound/antimony compound is set to 5:1-1:2, the result is preferred.

If the weight ratio defined above is lower or higher than the suggested range, the resultant polymer is colored or the rate of reaction is decreased sharply. On the other hand, when as a catalyst, using complex catalyst solution which comprises titanium compound and antimony compound in BD, elevated temperature of 20°–220° C. is good and preferably at 30°–80° C., excellent effects are exhibited.

Typically, titanium compounds are hydrolyzed easily and lacked heat-stability, but the complex catalyst according to the present invention overcomes such defects.

Thus, when using the complex catalyst, the color of produced polymer is not yellow but very transparent. In addition, since the amount of BD which is hydrated and converted to THF, is diminished greatly, good polymer can be produced increasingly.

Titanium compounds used as complex catalyst can be represented as Ti(OR)$_4$ of formula (I) and (RO)$_4$Ti 2HP(O)(OR')$_2$ of formula (II), wherein R and R' represent aliphatic, substitute or aromatic hydrocarbon and derivatives thereof which have carbon number of 1-20 (R and R' are same or different). For example, R or R' include methyl, ethyl, n-propyl, isopropyl, n-butyl, isobutyl, sec-butyl, tert-butyl, n-amyl, acetyl isopropyl, pentyl, hexyl, heptyl, 2-ethylhexyl, octyl, decyl, dodecyl, tridecyl, octadecyl, stearyl, allyl, 2,2-di allyloxymethylbutyl, cyclopentyl, cyclohexyl, naphthyl, phenyl, benzyl, dodecylbenzyl group etc. Besides these, titanium compounds for example, titanium ethylene glycoxide, halogenotitanium such as titaniumtetra chloride, titanium ester compound such as potassium oxalate, titanium compound of mono alkoxy such as isopropyl triisostearoyltitanate, isopropyl tri(N-ethylene diamino) ethyltitanate, chealate titanate compound such as dicumyloxo ethylene titanate, di(dioctyl) phosphato ethylene titanate, neoalkoxy titanate compound such as neopentyl (diallyl) oxy tri(N-ethylene diamino) ethyltitanate and neopentyl (diallyl) oxy tridodecylbenzenesulphonyl titanate, and hetero-cyclic titanate compound such as cyclo (dioctyl) pyrophosphato dioctyl titanate and dicyclo (dioctyl) pyrophosphato titanate can be used.

Also, as for the complex catalyst, antimony compound for example, antimony oxide such as antimony trioxide, antimony tetraoxide and antimony pentaoxide, halogeno antimony such as antimony trichloride and antimony trifluoride, antimony carboxylate such as antimony triacetate, antimony tristearate, antimony tribenzoate, antimony tri 2-ethyl hexeoate and antimony trioctoate, antimony compound combined with ether such as antimony trimethoxide, antimony ethyleneglycoxide, antimony triisopropoxide, antimony tri n-butoxide and antimony triphenoxide, antimony hydroxide and antimony sulfide or the like are used, especially, antimony trioxide, antimony triacetate and antimony ethyleneglycoxide are preferred. As indicated, the antimony compound and mixture with each one sort or more than two sorts of antimony and titanium compound as the complex catalyst, showed good result.

The amount of complex catalyst according to the present invention does not need to be limited specifically, but rate of reactions suitable for each reaction environment is desirable. Generally, it may be present in the final-resulted PBT based polymer, ranged from 0.005 to 0.5 parts by weight per 100 parts by weight of total polymer. Preferred amounts range from 0.01 to 0.2 parts by weight per 100 parts. In case of more or less than suggested range, slow rate of reaction and yellow coloration may occur against the purpose of this invention. In addition, the most proper time of adding the catalyst is before esterification, but divisional adding before esterifican and before condensation also exhibits good results.

In this invention, molar ratio of BD to terephthalate or diphenylterephthalate is ranged between 1.1 and 3.0 and at 150°–240° C. The reation is proceeded to obtain ester compound and then, carries out the condensation at 210°–250° C., under final vacuum degree of below 1.0 torr to obtain the polymer. Also, within purpose of this invention, other catalyst for example, well-known germanium compound such as germanium oxide, tin compound such as dibutyltinoxide and n-butyl hydroxy oxide, carboxylate compound of zinc, manganese and lead such as zinc acetate, manganese acetate and lead acetate, alkali metal compound such as sodium or potassium hydroxide and potassium acetate and alkali earth metal compound such as magnesium or potassium hydroxide and calcium acetate can be added together.

The process according to the present invention is efficiently applied to the case that the polymer is prepared by reaction of terephthalic acid or dicarboxylic acid mainly composed thereof and derivatives thereof with BD or glycol mainly composed thereof. In this case, representative acid and derivatives thereof are terephthalic acid and methyl terephthalate and representative glycol is BD. Above process is also applied to preparation of copolymerized polyester consisting of at least one kind of third component. However, the amount of the third component is desirable not to exceed 50 molar percent of the polymer. In this invention, as for substance of the third component, terephthalic acid compound and derivatives thereof, for example, aromatic, aliphatic and substitutic dicarboxylic acid such as phthalic acid, isophthalic acid, naphtalenedicarboxylic acid, diphenylsulphone dicarboxylic acid, diphenylmethane dicarboxylic acid, diphenyleneether dicarboxylic acid, diphenoxyethane dicarboxylic acid, malonic acid, succinic acid, glutamic acid, adipic acid, azelaic acid, sebacic acid, cyclohexane dicarboxylic acid, decalincarboxylic acid etc. and ester derivatives such as methylester, ethylester and phenyl ester compound of said acids can be used.

As for the glycol component, for example, aliphatic, aromatic and substitutic diols such as ethylene glycol, 1,3-propanediol, 1,2-propanediol, 1,2-butanediol, 1,5-pentanediol, 1,6-hexanediol, 1,4-cyclohexane dimethanol, 1,4-cyclohexanediol, bisphenol A, bisphenol S, bishydroxyethoxybisphenol A, tetraburotobisphenol A etc. can be included. Also, poly-functionality cross-linker compound such as trimelitic acid, trimecinic acid, pyro melitic acid, trimethylol propane, glycerine, pentaerithritol etc. and mono-functional end terminator such as monomethoxy polyethyleneglycol, stearyl alcohol, palmitic acid, benzoic acid, naphthoic acid etc. may be added. Additionally, in the usual preparation of polyester, phosphorous compound such as phosphoric acid, phosphorous acid, metaphosphoric acid, trimethylphosphate, triethylphosphate, triphenylphosphate, trioctylphosphite, diphenylphosphite, dioctylphosphate, distearylphosphite, ditridecylphosphite, dimethylpyrophosphate, diethylpyrophosphate, diphenylpyrophosphate, dicyclohexylpyrophosphate, dioctylpyrophosphate etc. as a heat-stabilizer can be added, and Irganox series (including phenol manufactured by Ciba-Geigy, Germany), for example Irganox 1010, Irganox 1076, Irganox 1098 etc. as an antioxidant can be added, too. Besides, if desired, additives such as ultraviolet absorbers, complementary color agent, softening point depression inhibitor extinction agent, nucleating agent, fluorescent agent, antistatic agent, flame-retardant and dyes may be used together.

As described above, according to the present invention, a process for the preparation of improved heat-stability and hydrolysis of catalyst to produce an excellent polymer having better color and smaller side-product, THF than conventional process.

The following examples are submitted for the purpose of further illustrating the present invention and are not intended as a limitation on the scope thereof. Parts referred to in the examples are by weight unless otherwise indicated. Inherent viscosity is measured at 25° C. after dissolved by heating in ortho-chlorophenol, and THF content is measured by gas chromatography. The color of obtained polymer is determined by using the colormeter, under the condition of chips and the value of "b" indicates a colored degree toward yellow (the smaller is the value, the better means the color).

By polymerization with complex catalyst of the present invention, within a short time, PBT having good color, with a side product, THF of small amount and high degree of polymerization is capable of being obtained.

EXAMPLE 1

Complex catalyst solution to solve 0.08 parts of tetraisopropyl di(dioctyl)phosphito titanate and 0.06 parts of antimony trioxide in 5.0 parts of 1,4-butandiol (BD) was heated at 50° C. for 1 hour and then added to an esterification reactor containing 75.5 parts of terephthalic acid and 64.6 parts of BD. Under the atmospheric pressure, the temperature was raised slowly so that final temperature became 230° C. Esterification with release of water and THF which were produced through a distillation tower, proceeded. 3 hours and 10 minutes after initiating the reaction, the reaction was terminated (THF yield: 5.3 parts). The ester compound produced was transferred to condensation reactor with stirrer and torque and Irganox 1010 (made by Ciba-Geigy) of 500 ppm was added to the end product, PBT. The temperature was slowly raised to final temperature of 245° C. Also, the pressure was lowered slowly to final pressure of 0.5 Torr and then condensation was carried out. In a condensation period of 2 hours 50 minutes, the reaction was finished and obtained a polymer of chip condition, by extruding to cooled water, through a lower nozzle of the reactor.

Produced polybutylene terephthalate had the inherent viscosity of 0.98 and the color (b value) of 1.6.

COMPARATIVE EXAMPLE

Esterification and condensation were carried out on the same condition as Example 1 except that the complex catalyst was replaced by 0.08 parts of titanium tetraisopropoxide as catalyst. After 3 hours and 15 minutes' esterification was finished, and the amount of THF obtained was 9.5 parts. Also, after 3 hours and 10 minutes' condensation, polybutylene terephthalate with inherent viscosity of 1.01 and b value of 3.5 was obtained.

EXAMPLE 2

Complex catalyst solution to solve 0.05 parts of tetraoctyl di(ditridecyl)phosphito titanate, 0.05 parts of titanium tetrabutoxide and 0.05 parts of antimony trioxide were heated in 5.0 parts of BD, instead of the complex catalyst in Example 1, at 120° C. for 20 minutes.

And then, esterification and condensation were carried out on the same condition as Example 1.

In 3 hours and 5 minutes, the reaction was terminated. The amount of THF produced was 7.8 parts. And after 2 hours and 45 minutes' condensation, polybutyleneterephthalate with inherent viscosity of 1.05 and b value of 2.6 was obtained.

EXAMPLE 3

Complex catalyst solution to solve 0.08 parts of tetra (2,2-diallyloxymethyl)butyl di(ditridecyl) phosphito titanate and 0.06 parts of antimony triacetate were heated in 5.0 parts of BD, at 150° C., for 50 minutes, then experiment was carried out in the same manner as Example 1. Esterification was terminated in 3 hours and 20 minutes and an amount of THF obtained was measured (6.3 parts). After 3 hours and 15 minutes' condensation, a resulted polymer having an inherent viscosity of 0.93 and b value of 2.1 was obtained.

EXAMPLE 4

An esterification and a condensation were carried out in the same manner as Example 1 except that a complex catalyst was used to which 0.05 parts of trimethylphosphate are added and antimony ethyleneglycoxide was used instead of antimony trioxide.

After 3 hours' esterification, the amount of obtained THF was 5.1 parts and after 3 hours and 5 minutes' condensation, a polymer having an inherent viscosity of 0.91 and b value of 1.6 was obtained.

EXAMPLE 5

An esterification was carried out in the same manner as Example 1 except for using a complex catalyst to solve 0.03 parts of antimony trioxide and 0.05 parts of tetraisopropyl di(dioctyl)phosphito titanate in 3.0 parts of BD.

After 3 hours and 20 minutes' esterification, the amount of obtained THF was 5.2 parts. Before condensation, a complex catalyst was added to solve 0.03 parts of antimony trioxide and 0.03 parts of said titanium compound in 2.0 parts of BD, and condensation was continuously carried out.

At the result, in 2 hours and 40 minutes' reaction, polymer with an inherent viscosity of 1.03 and b value of 1.9 was obtained.

EXAMPLE 6

Under atmospheric pressure, methanol and THF formed by using the same complex catalyst solution as Example 1 were released in an esterification reactor holding 88.1 parts of dimethyl terephthalate and 44.0 parts of BD, at final reaction temperature of 195° C.

2 hours and 20 minutes after starting the reaction, the esterification was finished (THF content: 0.3 parts). Then, the same condensation as Example 1 was carried out continuously. After 2 hours and 40 minutes, polymer with inherent viscosity of 1.02 and b value of 1.8 was obtained.

COMPARATIVE EXAMPLE 2

The esterification and the condensation were carried out in the same manner as Example 1 except that complex catalyst of Example 6 was replaced by 0.08 parts of titanium tetrabutoxide. After 2 hours and 30 minutes' esterification, the amount of THF was 0.8 parts, and, after 2 hours 50 minutes' condensation, obtained polybutyleneterephthalate having an inherent viscosity of 0.99 and b value of 3.0 was obtained.

What is claimed is:

1. A process for the preparation of a polybutyleneterephthalate polymer which comprises polymerizing terephthalic acid or dimethylterephthalate with 1,4-butanediol or glycol, characterized by using a complex catalyst composed of a titanium compound, and an antimony compound as a reaction catalyst, the titanium compound being of the formula (I), the formula (II) or mixtures thereof $$Ti(OR)_4 \qquad (I)$$
$$(RO)_4Ti.2HP(O)(OR')_2 \qquad (II)$$

wherein R and R' represent individually methyl, ethyl, n-propyl, isopropyl, n-butyl, isobutyl, sec-butyl, tert-butyl, n-amyl, acetylisopropyl, pentyl, hexyl, heptyl, 2-ethyl hexyl, octyl, decyl, dodecyl, tridecyl, octadecyl, stearyl, allyl, 2,2-diallyloxymethylbutyl, cyclopentyl, cyclohexyl, naphthyl, phenyl, benzyl, or dodecybenzyl group.

2. The process of claim 1, wherein said antimony compound is selected from the group consisting of antimony trioxide, antimony triacetate and antimony ethyleneglycoxide.

3. The process of claim 1, wherein said complex catalyst comprises a weight ratio of titanium compound to antimony compound of from 10:1 to 1:10.

4. The process of claim 1, wherein said complex catalyst is used in an amount of from 0.005 to 0.5% by weight of the polybutylene terephthalate.

5. The process of claim 1, wherein said complex catalyst is heated in 1,4-butanediol at the temperature of 20°–220° C. before the reaction.

6. The process of claim 1, wherein the titanium compound is of formula (I).

7. The process of claim 1, wherein the titanium compound is of formula (II).

8. The process of claim 1, wherein the titanium compound is a mixture of a compound of formula (I) and a compound of formula (II).

* * * * *